United States Patent Office 3,084,268
Patented Apr. 2, 1963

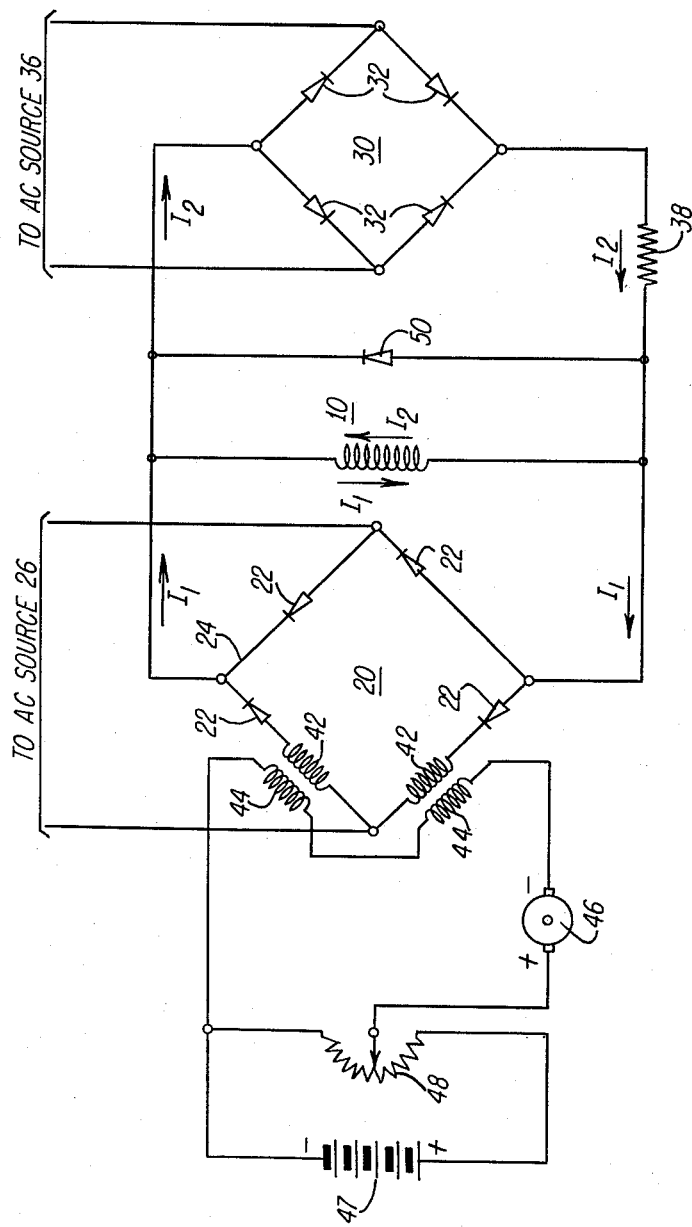

3,084,268
COMPENSATED CONTROL CIRCUIT
Alan W. Wilkerson, Racine, and Hans R. A. Hansen, Milwaukee, Wis., assignors to The Louis Allis Co., Milwaukee, Wis., a corporation of Wisconsin
Filed Aug. 24, 1960, Ser. No. 51,577
12 Claims. (Cl. 310—95)

This invention relates in general to a control circuit for eddy current operated apparatus such as dynamometers, brakes and clutches and in particular to a control circuit capable of completely shutting off the eddy current operated apparatus.

Eddy current devices are generally controlled by controlling the excitation current delivered to the field coil associated with these devices. The torque provided by these devices is approximately proportional to the excitation current in the field coil, and the speed of rotation of the rotating shaft associated with these devices is dependent on both the excitation current delivered to the field coil and the load which the rotating shaft must drive. Under light load or no load conditions the speed of rotation of the rotating shaft approaches the maximum attainable speed of the device even when small excitation current is delivered to the field coil. Therefore, in order to bring the rotating shaft to rest under light load or no load conditions it is essential that relatively no excitation current be delivered to the field coil.

Control circuits utilizing grid controlled electron flow devices as, for example, vacuum and gas tubes for controlling the excitation current delivered to the field coil of the eddy current devices are readily rendered non-conducting and in this respect are quite suitable for delivering no excitation current to the field coil. However, these electron load devices are relatively delicate elements and present a very definite maintenance problem. Also the required warm up time and the cooling problem associated with these tubes make their use undesirable in many applications.

Magnetic amplifiers because of their rugged construction and long life and their absence of a required warm up time would appear at first inspection to be a very suitable substitute for these electron flow tubes associated with control circuits for controlling the excitation current delivered to the field coil of these eddy current devices. Heretofore the advantages of magnetic amplifiers in control circuits for controlling the excitation current delivered to the field coil of eddy current devices has been offset by the fact that the output of a magnetic amplifier cannot be reduced to zero even when there is no input signal. The magnetic amplifier, even when there is no input signal, delivers a small excitation current to the field coil of the eddy current devices. Therefore, when there is no load on the rotating shaft associated with these eddy current devices the rotating shaft will rotate at a very high speed. To prevent the acceleration of the rotating shaft under light load or no load conditions, specially designed magnetic amplifiers have been provided, however, these specially designed magnetic amplifiers add to the cost of the control circuit and also the complexity of the circuit itself. Because of the infirmity of magnetic amplifiers heretofore discussed, magnetic amplifiers have not been used in many applications involving the control of eddy current devices where their potential for use is very great.

It is therefore an object of this invention to provide a circuit arrangement utilizing magnetic amplifiers for controlling the excitation current delivered to the field coil of a device such as an eddy current machine.

It is a further object of this invention to provide a circuit arrangement utilizing magnetic amplifiers for controlling the excitation current delivered to the field coil of a device such as an eddy current machine wherein the excitation current delivered to the field coil may be substantially zero.

It is a further object of this invention to provide a circuit arrangement utilizing magnetic amplifiers for controlling the excitation current delivered to the field coil of a device such as an eddy current machine which is inexpensive and easy to construct and which has no moving parts.

Briefly the invention comprises a circuit arrangement wherein the excitation current delivered to the field coil of an eddy current device from the output of a magnetic amplifier may be reduced to substantially zero when it is desired to bring the rotating shaft of the eddy current device to rest. The circuit arrangement comprises circuit means for providing a current through the field coil in an opposite direction to the excitation current delivered to the field coil from the output of a magnetic amplifier. The circuit arrangement is further provided with means for regulating the magnitude of the current flowing through the field coil in an opposite direction such that the composite current flowing through the field coil of the eddy current device will be substantially zero when it is desired to bring the rotating shaft of the eddy current device to rest.

The objects and features of this invention including those already mentioned will be more readily understood if the following is viewed in light of the drawing wherein one embodiment of the invention is schematically illustrated.

Referring now to the drawing there is schematically illustrated a field coil 10 which may be associated with a device such as an eddy current machine and the excitation current delivered to the field coil 10 controls the torque which is transmitted to the rotating shaft associated with such a device. A first source of uni-directional control current is designated as 20. Source 20 delivers a current designated as $I_1$ to the field winding 10 responsive to the condition of a magnetic amplifier illustrated in part as windings 42 and 44. The current $I_1$ delivered to the field winding 10 may be termed the field winding excitation current and the magnitude thereof determines the torque or force which is delivered to the rotating shaft associated with the field winding 10. Source 20 comprises a bridge rectifier circuit having a plurality of rectifiers connected in a standard manner as illustrated in the drawing. The input of the bridge rectifier circuit is connected to an alternating current source 26 as illustrated in the drawing. The output windings 42 of the magnetic amplifier is positioned in two legs of the bridge rectifier as shown. Only the control windings 44 and the output windings 42 of the magnetic amplifier are illustrated for purposes of simplicity. The control or input windings 44 of the magnetic amplifier are illustrated as two separate windings and it should be understood that this is not an essential requirement. Also the output windings 42 of the magnetic amplifier are illustrated as being two windings and again this is not essential inasmuch as windings 42 may be portions of one winding having a center tap provided therein. The magnitude of the excitation current $I_1$ delivered to the field coil 10 will be determined by the impedances of the output windings 42 of the magnetic amplifier. The output windings 42 of the magnetic amplifier vary in impedance in response to the signal applied to the control or input windings 44 of the magnetic amplifier thus varying the magnitude of the excitation current $I_1$ delivered to the field coil 10.

The control windings 44 of the magnetic amplifier are connected to a reference source 47 through a potentiometer 48 as illustrated in the drawing. A direct current tachometer generator 46 is connected in series with the potentiometer 48. The direct current tachometer generator 46 supplies a variable input control signal as will be seen hereinafter. The direct current tachometer generator 46 may be attached to the rotating shaft associated with the field coil winding 10 and will provide a signal proportional to the speed of rotation of the rotating shaft.

The input control signal, however, need not be restricted to a control signal indicating the speed of the rotating shaft but may be a signal provided by transducers which provide a direct current output signal proportional to other parameters such as torque, linear speed, material tension or position and so forth.

In the illustrated example, when it is desired to bring the rotating shaft (not shown) up to a predetermined speed, potentiometer 48 is adjusted to that point corresponding to the desired speed. A signal is therefore applied to the control windings 44 of the magnetic amplifier from the reference source 47 through the potentiometer 48 and through the tachometer generator 46. The control windings 44 of the magnetic amplifier thereby lowers the impedance of the output windings 42 of the magnetic amplifiers. The decrease in the impedance of the output windings 42 of the magnetic amplifier increases the excitation current $I_1$ delivered to the field coil winding 10. The increase in the excitation current $I_1$ delivered to the field coil winding 10 increases the speed of the rotating shaft associated with the field coil winding 10 and thereby increases the output of the direct current tachometer generator 46 attached to the rotating shaft associated with the field coil winding 10. The output of the direct current tachometer 46 is connected in the input circuit of the magnetic amplifier as illustrated in the drawing and the polarity of the output of generator 46 is such as to oppose the voltage delivered from the reference source 47. As the rotating shaft comes up to the predetermined speed the output of generator 46 increases and therefore the composite input signal to the control windings 44 of the magnetic amplifier decreases. Subsequently an equilibrium is reached between opposing signals of the reference source 47 and the direct tachometer generator 46 and the rotating shaft rotates at a predetermined speed. Thereafter any incipient changes in the speed of the rotating shaft will be sent back to the input circuit of the magnetic amplifier as increased or decreased signal due to the presence of the tachometer generator 46 in the input circuit and the excitation circuit $I_1$ delivered to the field coil winding 10 will increase or decrease to compensate for the variation in the speed of the rotating shaft.

When it is desired to bring the rotating shaft to rest the potentiometer 48 is adjusted so as to effectively remove the reference source 47 from the input circuit of the magnetic amplifier. The rotating shaft will subsequently tend to come to rest. The polarity of the output of the tachometer generator 46 is such as to oppose the rotation of the rotating shaft and will not deliver an undesired regenerative feed back signal.

Even when the control windings 44 of the magnetic amplifier have no signal applied thereto the output windings 42 of the magnetic amplifier still have a finite impedance and therefore permit a small excitation current to be transmitted to the field coil winding 10 from the alternating current source 26. If at the same time that the small excitation current is flowing through the field coil winding 10 due to the finite impedances of the output windings 42 of the magnetic amplifier a light load or no load exists upon the rotating shaft, then the rotating shaft responsive to the excitation current flowing in field winding 10 will rotate at a very high speed and therefore at no load or light load conditions it becomes impossible to bring the rotating shaft to rest without also removing the alternating current source from the circuit.

Therefore a second source 30 of uni-directonal current is provided. Source 30 also comprises a standard bridge rectifier circuit. The input of the bridge rectifier circuit is connected to an alternating current source 36 which may be connected to the same source as the alternating source 26 supplying alternating current to the source 20. The bridge rectifier circuit is connected oppositely as compared to the bridge rectifier circuit of the source 20 and the output current from the uni-directional current source 30 which is labeled $I_2$ is of an opposite polarity with respect to the output current $I_1$ from the uni-directional current source 20. Therefore, the composite current flowing through the field coil winding 10 is the sum of the excitation current $I_1$ and the opposing current $I_2$. A diode 50 is connected across the field coil winding 10 and will conduct only when the magnitude of the opposing current $I_2$ exceeds the field excitation current $I_1$ and the opposing current $I_2$ flows in a direction as indicated in the drawings. Thereafter any portion of the opposing current $I_2$ which exceeds the field excitation current $I_1$ will be shunted across coil winding 10 by diode 50. The particular functions of the diode 50 will be more clearing seen herein after. Resistor 38 is placed in series with the output of the uni-directional current source 30 so as to limit the opposing current $I_2$ to a predetermined value.

The operation of the circuit is as follows: when the circuit illustrated in the drawing is first turned on by connecting the input of the uni-direction sources 20 and 30 to the alternating current sources 26 and 36, respectively, and the potentiometer 48 is set for zero signal a small excitation current $I_1$ flows in the field coil winding 10 as previously described. An opposing current $I_2$ is also circulating through the field coil winding 10 from the output of the bridge rectifier of the uni-directional current source 30 through resistor 38 and through the field coil winding 10. The value of the resistor 38 may be adjusted such that the opposing current $I_2$ will be just equal to the excitation current $I_1$ delivered from the uni-directional current source 20 when the speed setting potentiometer 48 is set for zero speed or, in other words, when there is no input signal delivered to the magnetic amplifier input windings 44. Therefore, the composite sum of the excitation current $I_1$ and the opposing $I_2$ through the field coil winding 10 will be zero when there is no input signal to the input windings 44 of the magnetic amplifier.

However, the magnitude of the excitation current $I_1$ will not always be the same and will vary with the magnitude of the alternating current source and with temperature and all the other normal parameters which effect the output current of any circuit. Therefore, diode 50 is connected across the field coil winding 10 as illustrated in the drawing. Thereafter when the current $I_2$ from the uni-directional current source 30 is greater than the excitation current $I_1$ delivered from the uni-directional current source 20, diode 50 conducts. Any excess current from the uni-directional current source 30 in excess of that needed to balance the current from the uni-directional current source 20 is bypassed through the diode 50. Due to this exact balancing of the current through the field coil winding 10 when there is no input signal to the magnetic amplifier the rotating shaft associated with the field coil winding 10 comes to rest under a light load or no load condition.

As the reference control signal 47 is applied by setting the speed setting potentiometer 48 to a preselected position, an input signal is delivered to the input windings 44 of the magnetic amplifier thereby decreasing the impedance of the output windings 42 of the magnetic amplifier. The decrease in impedance of the windings 42 increases the output or excitation current $I_1$ of the uni-directional current source 20. The magnitude of excitation current $I_1$ then exceeds the magnitude of the opposing current $I_2$. Excitation current flows in the field coil winding 10 thereby causing the rotating shaft associated with the field coil winding 10 to increase in speed. The increase in speed of the rotating shaft associated with the field coil winding 10 will be reflected back and subsequently, a balance is reached as previously described.

When it is desired to shut the machine off, in other words, to have the rotating shaft associated with the field coil winding 10 to come to rest, the potentiometer 48 is set to its zero position and the speed of the rotating shaft decreases. The excitation current $I_1$ decreases and when the excitation current $I_1$ becomes less than the opposing current $I_2$ diode 50 is rendered conducting and subsequently no current flows through the field coil winding 10.

If it is desired, diode 50 may be omitted and a variable resistance substituted for resistance 38 and in such a situation the variable resistor 38 is manually adjusted so that the opposing current $I_2$ just equals the excitation current $I_1$ delivered to the field coil winding 10 when there is no input signal to the input windings 44 of the magnetic amplifier.

Numerous modifications and alterations may be made in the above described embodiment of the invention without departing from the true inventive spirit disclosed therein. It is intended that the appended claims cover all such modifications and alterations which fall within the true spirit and scope of this invention.

What is claimed is:

1. A control circuit for a direct current field coil having operably associated therewith a rotating shaft, a magnetic amplifier having an input winding and an output winding, said output winding connected to said field coil, said magnetic amplifier being connected such that a finite output current is delivered to said field coil even when said magnetic amplifier is without an input signal, a compensating current source connected to said field coil for delivering a current to said field coil of an opposite polarity with respect to said output current and of an equal magnitude as said output current when said magnetic amplifier has no input signal connected thereto.

2. A control circuit for a direct current field coil having operably associated therewith a rotating shaft, a magnetic amplifier having an input and an output winding, said output winding connected to said field coil, said magnetic amplifier being connected such that a finite output current is delivered to said field coil even when said magnetic amplifier is without an input signal, a compensating current source connected to said field coil for delivering a current to said field coil of an equal and opposite polarity with respect to said output current when said magnetic amplifier has an output current below a predetermined value.

3. A control circuit for a direct current field coil having operably associated therewith a rotating shaft, a magnetic amplifier having an input winding and an output winding, said output winding connected to said field coil, said magnetic amplifier being connected such that a finite output current is delivered to said field coil even when said magnetic amplifier is without an input signal, a compensating circuit connected to said field coil for delivering a current to said field coil of an equal magnitude and opposite polarity with respect to said output current whenever said output current is below a predetermined value.

4. A control circuit for a direct current field coil having operably associated therewith a rotating shaft, a magnetic amplifier having a control winding and an output winding, said output winding connected to said field coil, said control winding connected to an input circuit, said input circuit comprising a reference signal source and a source proportional to a parameter of said rotating shaft, said magnetic amplifier being connected such that a finite output current and of a predetermined polarity is delivered to said field coil even when said magnetic amplifier is without an input signal, a compensating circuit connected to said field coil for delivering a current to said field coil of an opposite polarity with respect to said predetermined polarity output current and of an equal magnitude with respect to said finite output current when said magnetic amplifier has no input signal connected thereto.

5. A control circuit for a direct current field coil having operably associated therewith a rotating shaft, a magnetic amplifier having an input winding and an output winding, an input signal source connected to the input winding of said magnetic amplifier, the output winding of said magnetic amplifier being connected to a power source and said field coil, the excitation current delivered to said field coil from said power source being controlled by said magnetic amplifier, a compensating current source connected to said field coil for delivering a current to said field coil of an opposite polarity with respect to said excitation current and of an equal magnitude with respect to said excitation current when said magnetic amplifier has no input signal connected thereto.

6. A control circuit for a field coil having operably associated therewith a rotating shaft, a magnetic amplifier having an input winding and an output winding, an input signal source connected to said input winding of said magnetic amplifier, the output winding of said magnetic amplifier being connected to a power source and said field coil, the excitation current delivered to said field coil from said power source being controlled by said magnetic amplifier, a compensating current source connected to said field coil for delivering an opposing current to said field coil of an opposite polarity with respect to said excitation current and of an equal magnitude with respect to said excitation current when said magnetic amplifier has no input signal connected thereto, a uni-directional conducting means connected across said field coil in such a manner as to be conducting when the magnitude of the current delivered to said field coil from said compensating current source is greater than the magnitude of the excitation current delivered to said field coil.

7. A control circuit for a direct current field coil having operably associated therewith a rotating shaft, a magnetic amplifier having an input winding and an output winding, an input signal source connected to said input winding of said magnetic amplifier, the output winding of said magnetic amplifier being connected to an alternating current power source, said field coil and a first uni-directional conducting device, the excitation current delivered to said field coil from said power source being controlled by the impedance of said output winding of said magnetic amplifier, a compensating current source connected to said field coil for delivering an opposing current to said field coil of an opposite polarity with respect to said excitation current and of an equal magnitude with respect to said excitation current when said magnetic amplifier has no input signal connected to said input winding of said magnetic amplifier, a second uni-directional conducting device connected to said field coil and in a manner so as to be conducting when the magnitude of said opposing current is greater than the magnitude of said excitation current.

8. A control circuit for a direct current field coil having operably associated therewith a rotating shaft, a magnetic amplifier having an input winding and a center tapped output winding, an input signal source connected to said input winding of said magnetic amplifier, the output winding of said magnetic amplifier being connected in a bridge rectifier circuit with half of said output winding being connected in one leg of said bridge rectifier and the other half of said output winding being connected in a second leg in said bridge rectifier circuit, an alternating current power source being connected to input terminals of said bridge rectifier circuit, the output terminals of said bridge rectifier circuit being connected to said field coil, the excitation current delivered to said field coil from said bridge rectifier circuit being controlled by the impedance of said output winding of said magnetic amplifier, a compensating current source connected to said field coil for delivering an opposing current to said field coil of an opposite polarity with respect to said excitation current and of an equal magnitude with respect to said excitation current when said magnetic amplifier has no input signal connected thereto, a uni-directional conducting device connected across the field coil and in such a manner as to be conducting when the excitation current delivered to said field coil is less than said opposing current delivered to said field coil from said compensating current source.

9. A control circuit as in claim 8 wherein said input signal source comprises a reference source and a feed back control signal, said reference source and said feed back control signal connected so as to oppose one another, said feed back control signal being proportional to a parameter of said rotating shaft.

10. A control circuit for a direct current field coil having operably associated therewith a rotating shaft, a magnetic amplifier having a pair of input windings connected in series and a pair of output windings connected in series, an input signal source connected to said input windings of said magnetic amplifier, said input signal source comprising a reference source and a feed back signal source, said feed back signal source and said reference source connected so as to oppose one another, said feed back signal source providing a signal proportional to a parameter of said rotating shaft, a four branch bridge rectifier circuit having a pair of input and output terminals and having a unidirectional conducting device connected in each of said four branches of said bridge circuit, an alternating current source connected to the input terminals of said bridge rectifier circuit, the output terminals of said bridge rectifier connected to said field coil, said pair of output windings of said magnetic amplifier being connected in said bridge circuit such that one of said output windings of said magnetic amplifier is in one conducting path of said bridge rectifier circuit and the other output winding of said magnetic amplifier being connected in the other conducting path of said bridge rectifier circuit, the excitation current delivered to said field coil from the output terminals of said bridge rectifier circuit being determined by the impedance which said pair of output windings of said magnetic amplifier presents to said alternating current source, a compensating current source connected to said field coil for delivering an opposing current to said field coil of an opposite polarity with respect to said excitation current and of an equal magnitude with respect to said excitation current when said magnetic amplifier has no input signal connected to said input windings of said magnetic amplifier, a uni-directional conducting device associated with said compensating circuit and connected across said field coil and in a manner so as to be conducting when the magnitude of said excitation current is less than the magnitude of said opposing current.

11. A control circuit as in claim 10 wherein said compensating current source comprises an alternating current source, and means of rectifying said alternating current source.

12. A control circuit for a direct current field coil having operably associated therewith a rotating shaft, a magnetic amplifier having an input winding and an output winding, an input signal source connected to said input winding of said magnetic amplifier, the output winding of said magnetic amplifier being connected to a power source and said field coil, the excitation current delivered to said field coil from said power source being controlled by the impedance of said output winding of said magnetic amplifier, a compensating current source connected to said field coil for delivering an opposing current to said field coil of an opposite polarity with respect to said excitation current and of an equal magnitude with respect to said excitation when said magnetic amplifier has no input signal connected to said input winding of said magnetic amplifier, said compensating current comprising a source of uni-directional current and a first impedance, said first impedance being adjusted such that said opposing current provided by said compensating current source is equal in magnitude and opposite in polarity with respect to said excitation current when said magnetic amplifier has no input signal connected to said input winding of said magnetic amplifier.

References Cited in the file of this patent
UNITED STATES PATENTS

| | | |
|---|---|---|
| 2,524,222 | Garde | Oct. 3, 1950 |
| 2,551,839 | Jaeschke | May 8, 1951 |